(12) United States Patent
Kurz

(10) Patent No.: US 7,401,561 B1
(45) Date of Patent: Jul. 22, 2008

(54) SUSPENSION SYSTEM FOR A ROW CROP PLANTER UNIT

(76) Inventor: Clare D. Kurz, 231 8th Ave., Palmer, NE (US) 68864

( * ) Notice: Subject to any disclaimer, the term of this patent is extended or adjusted under 35 U.S.C. 154(b) by 0 days.

(21) Appl. No.: 11/895,948

(22) Filed: Aug. 28, 2007

Related U.S. Application Data

(60) Provisional application No. 60/964,920, filed on Aug. 16, 2007.

(51) Int. Cl.
*A01C 5/00* (2006.01)
*A01C 7/18* (2006.01)

(52) U.S. Cl. .......................... 111/62; 111/926; 111/927

(58) Field of Classification Search ............ 111/52–81, 111/134–137, 200, 925–927
See application file for complete search history.

(56) References Cited

U.S. PATENT DOCUMENTS

| | | | |
|---|---|---|---|
| 4,275,670 A | 6/1981 | Dreyer | |
| 4,305,486 A * | 12/1981 | Cowan | 188/282.1 |
| 4,548,419 A * | 10/1985 | Pigott et al. | 280/203 |
| 4,913,070 A | 4/1990 | Morrison, Jr. | |
| 5,158,411 A | 10/1992 | Kemmner | |
| 5,709,271 A | 1/1998 | Bassett | |
| 5,823,517 A | 10/1998 | Huang et al. | |
| 6,389,999 B1 * | 5/2002 | Duello | 111/200 |
| 6,454,019 B1 | 9/2002 | Prairie et al. | |
| 6,520,100 B1 | 2/2003 | Spooner, Sr. et al. | |
| 6,701,857 B1 * | 3/2004 | Jensen et al. | 111/200 |
| 6,895,876 B2 | 5/2005 | Bergere et al. | |
| 2006/0046826 A1 * | 3/2006 | Gilmartin | 463/19 |
| 2006/0213407 A1 | 9/2006 | Sauder et al. | |

OTHER PUBLICATIONS

Monosem brochure "NG Plus Series", undated.

\* cited by examiner

*Primary Examiner*—Christopher J. Novosad
(74) *Attorney, Agent, or Firm*—Thomte Patent Law Office; Dennis L. Thomte

(57) ABSTRACT

A suspension system for a row crop planter unit which includes a shock absorber extending between the planter unit mounting bracket and the parallel arm linkage which vertically mounts the planter unit to a toolbar. The shock absorber permits the planter unit to move more quickly in the rebound cycle than in the compression cycle to reduce row unit bounce.

10 Claims, 6 Drawing Sheets

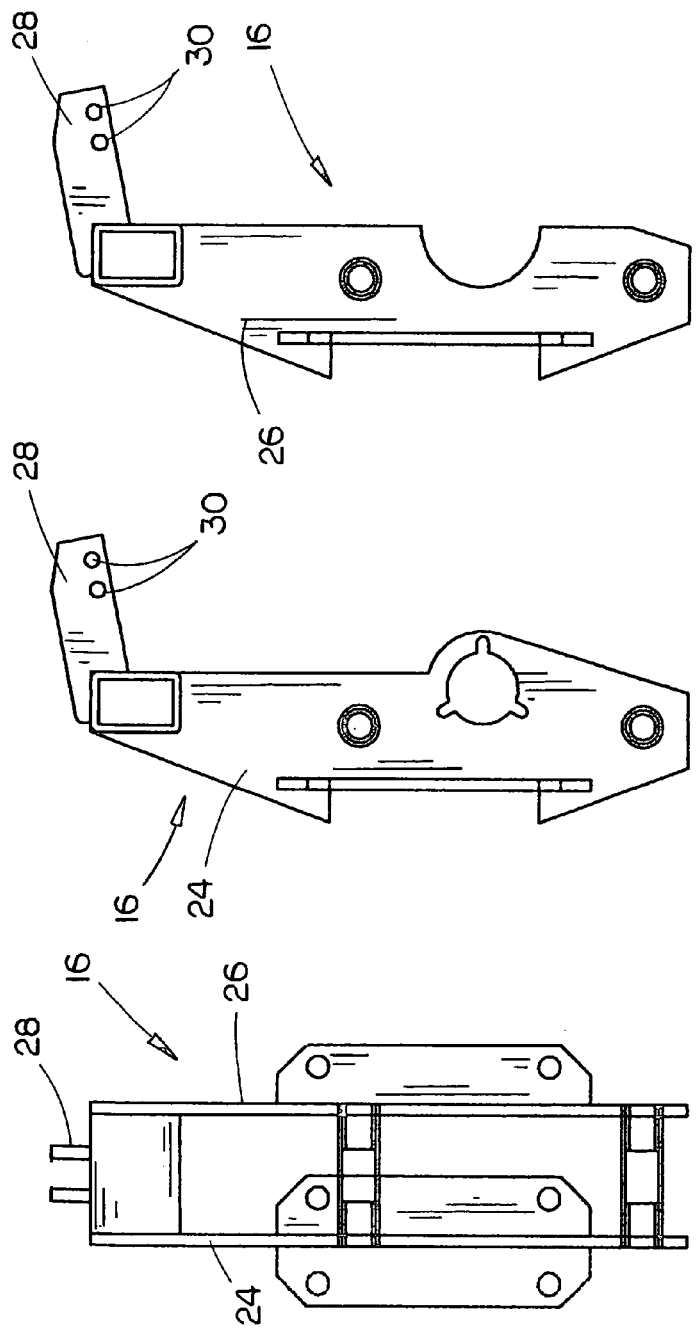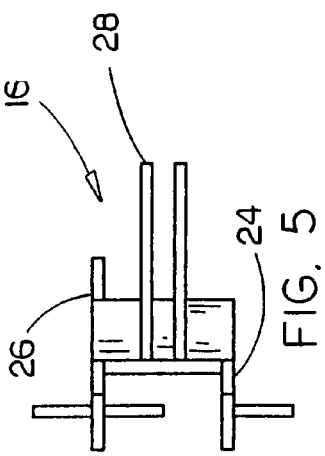

SUSPENSION SYSTEM FOR A ROW CROP PLANTER UNIT

CROSS-REFERENCE TO RELATED APPLICATION

This application claims the benefit of U.S. Provisional Application Ser. No. 60/964,920 entitled "SUSPENSION SYSTEM FOR A ROW CROP PLANTER UNIT" filed Aug. 16, 2007, the disclosure of which is hereby incorporated herein by reference.

BACKGROUND OF THE INVENTION

1. Field of the Invention

This invention relates to a suspension system for a row crop planter unit and more particularly to a suspension system preferably in the form of a coil-over shock absorber which is operatively connected to the supporting frame of the planter unit and to the parallel arm linkage of the row crop planter unit to reduce row unit bounce (R.U.B.).

2. Description of the Related Art

Many types of suspension systems or mounting systems for row crop planter units have been previously provided. In most instances, the row crop planter units are connected to a transversely extending toolbar in a horizontally spaced-apart manner for single row planting or in a horizontally spaced-apart and staggered or offset manner for twin row planting. The toolbar is normally wheel supported or three-point hitch supported and is pulled through a field by a prime mover such as a tractor or the like. Each of the planter units is normally connected to the toolbar by means of a parallel arm linkage so that the planter units may vertically move with respect to the toolbar. As the planter is pulled through the field, the planter units tend to bounce upwardly and downwardly due to encountering uneven terrain. If the planter unit does objectionably bounce, the seed spacing and seed depth of the planter unit will not be proper. Seed spacing is extremely important in planting operations wherein single rows are planted, and is even more important when the row crops are being planted in twin rows.

One prior art method of attempting to reduce the row unit bounce is to utilize coil springs which interconnect the upper and lower parallel arms of each of the parallel arm linkages. See, for example, U.S. Pat. No. 5,709,271 and published application No. 2006/0213407 A1. The coil springs of the prior art do exert a certain amount of down pressure on the planter unit and do reduce row unit bounce to some degree. However, it has been found that the coil spring arrangements commonly found in the prior art do not satisfactorily reduce row unit bounce thereby resulting in improper seed spacing and seed depth.

SUMMARY OF THE INVENTION

A suspension system is provided for a row crop planter unit wherein a plurality of the row crop planting units are positioned rearwardly of a transversely extending frame member or toolbar. Each of the planter units is pivotally connected to the toolbar by a parallel arm linkage including a pair of upper parallel arms and a pair of lower parallel arms. The parallel arm linkage enables the planter unit to move vertically with respect to the toolbar. The forward ends of the upper and lower pairs of parallel arms for each planter unit are pivotally connected to a mounting bracket secured to the toolbar. In some cases, the mounting brackets permit the planter units to be staggered to enable the row crop to be planted in twin rows. The rearward ends of the upper and lower pairs of parallel arms are pivotally connected to the planter unit.

A fluid-filled shock absorber, preferably of the coil-over shock type, is associated with each of the parallel arm linkages. The upper end of the shock absorber is pivotally secured to the upper end of the associated mounting bracket and extends downwardly and rearwardly therefrom. The lower end of the shock absorber is pivotally connected to the lower pair of parallel arms of the parallel arm linkage. The shock absorber is available for purchase and includes a rebound chamber and a compression chamber separated by a piston which includes valving. The fluid in the compression chamber is compressed as the planter unit moves upwardly with respect to the toolbar and the fluid in the rebound chamber of the shock absorber is compressed as the row unit moves downwardly with respect to the toolbar. The shock absorber is designed so that the damping force in the compression cycle is greater than the damping force in the rebound cycle. In other words, the fluid in the compression chamber will flow through the valving in the piston during the compression cycle at a slower rate (velocity) than the fluid in the rebound chamber will flow through the piston during the rebound cycle. The lower compression damping in the rebound cycle allows the row unit to move down quickly and the greater compression damping in the compression cycle reduces the rate of upward bounce of the row unit, thereby maintaining better seed depth and seed spacing. The shock absorber, by way of the coil-over construction, maintains down pressure throughout the entire travel range. The coil-over spring of the shock absorber may be preloaded to increase down pressure.

It is therefore a principal object of the invention to provide an improved suspension system for a row crop planter unit.

A further object of the invention is to provide a suspension system for a row crop planter unit which includes a shock absorber operatively connected to the parallel arm linkage of each planter unit to reduce row unit bounce.

Yet another object of the invention is to provide a suspension system of the type described above wherein the shock absorber is a coil-over shock absorber wherein the spring may be preloaded to increase down pressure.

Yet another object of the invention is to provide a suspension system of the type described above wherein the shock absorber has a higher compression damping force than rebound damping force which allows the row unit to go down quickly but will not bounce up quickly, maintaining better seed depth and seed spacing.

Still another object of the invention is to provide a suspension system for a row crop planter unit which employs a fluid-filled shock absorber.

Still another object of the invention is to provide a suspension system for a row crop planter unit including a gas pressurized shock absorber.

Yet another object of the invention is to provide a suspension system for a row crop planter unit which maintains pressure throughout the entire travel range of the row crop planter unit.

Still another object of the invention is to provide a suspension system for a row crop planter unit which is economical of manufacture and durable in use.

These and other objects will be obvious to those skilled in the art.

BRIEF DESCRIPTION OF THE DRAWINGS

FIG. 2 is a rear view of the mounting bracket for the suspension system;

FIG. 3 is a side view of one of the plates of the mounting bracket;

FIG. 4 is a side view of the other plate of the mounting bracket;

FIG. 5 is a top view of the mounting bracket;

DETAILED DESCRIPTION OF THE INVENTION

Figure 1:
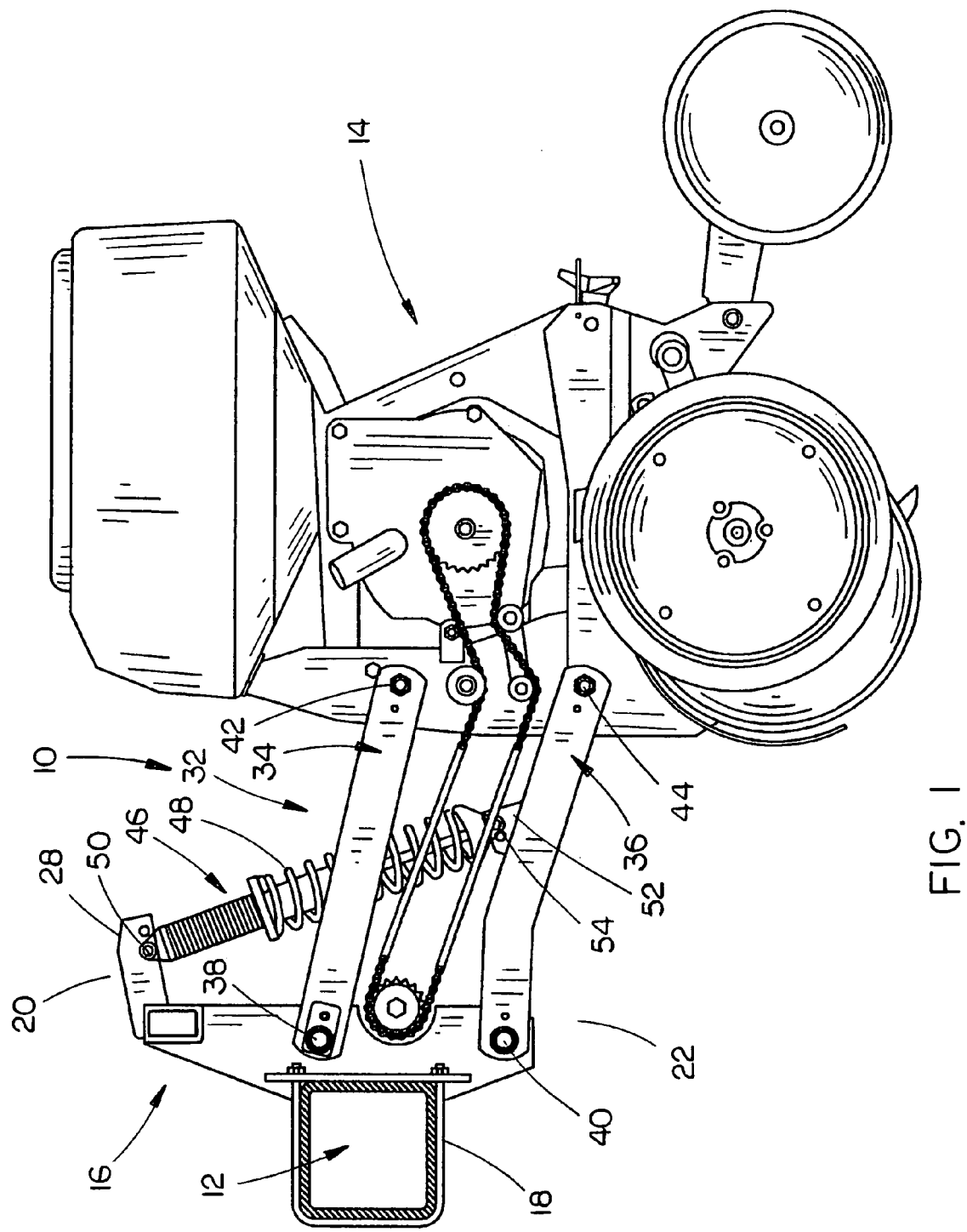
FIG. 1 is a side view of a row crop planter unit having the suspension system of this invention mounted thereon.
Figure 6:
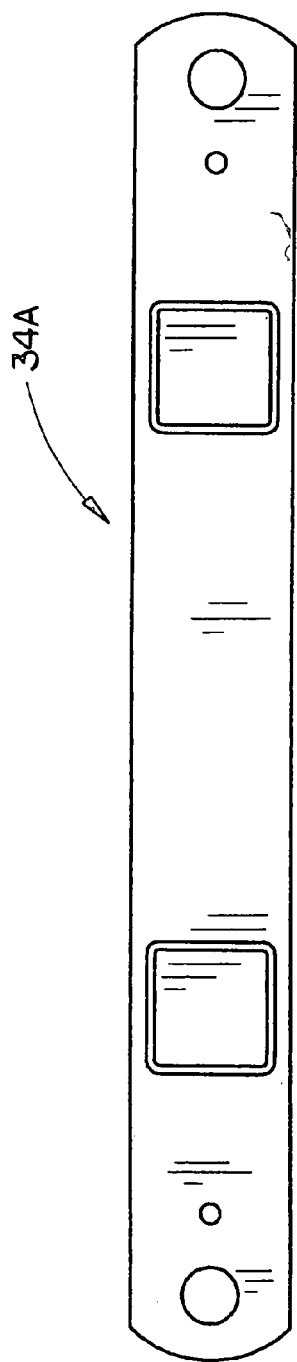
FIG. 6 is a side view of one of the arms of the upper pair of parallel arms.
Figure 7:
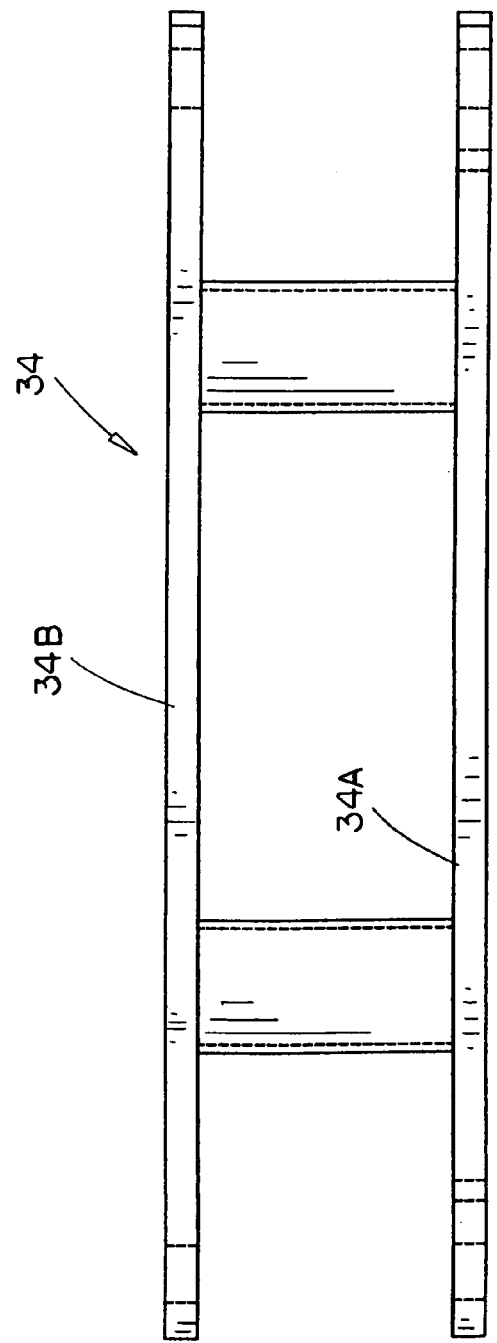
FIG. 7 is a top view of the upper pair of parallel arms.
Figure 8:
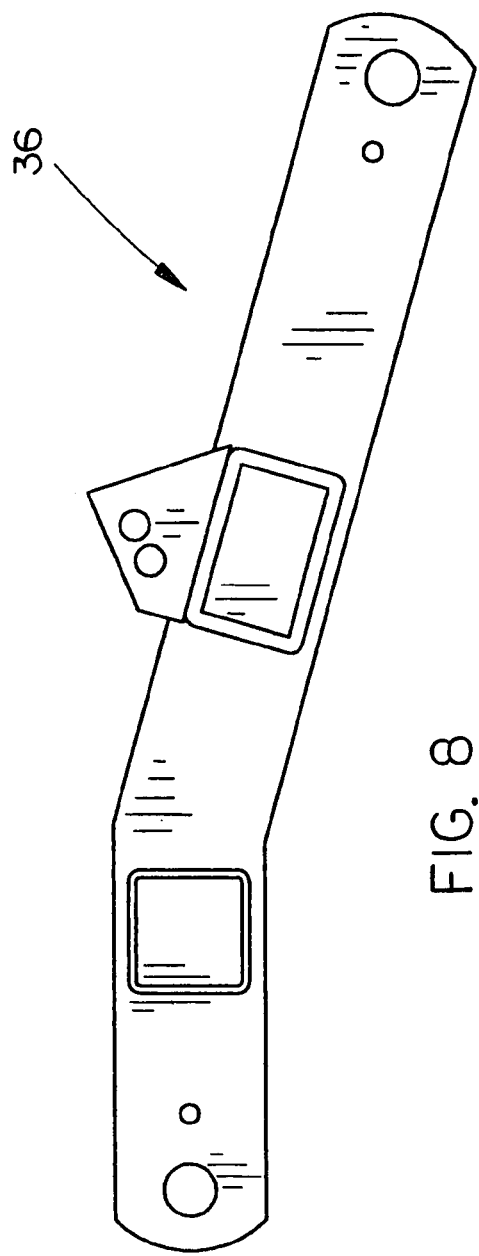
FIG. 8 is a side view of one of the arms of the lower pair of parallel arms.
Figure 9:
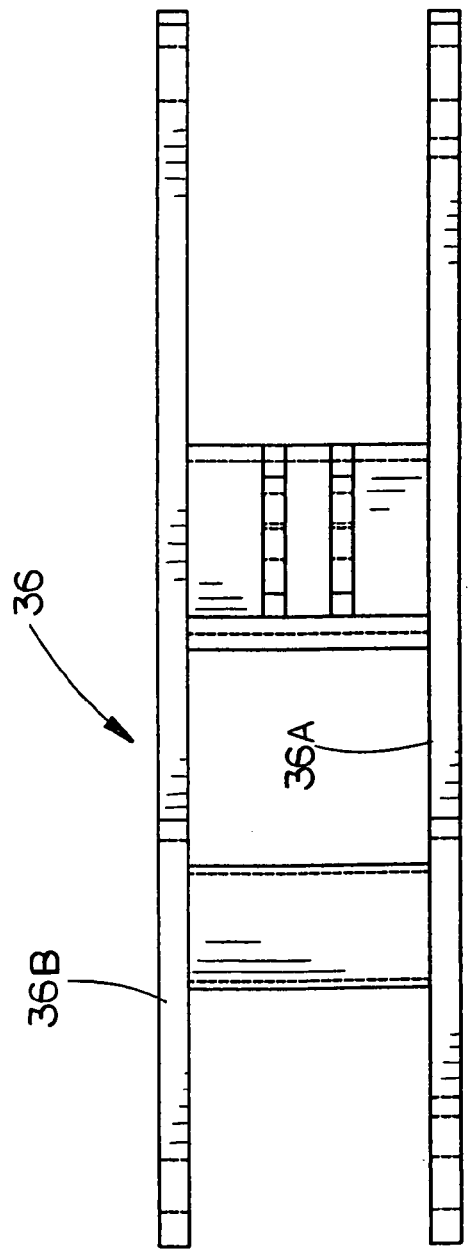
FIG. 9 is a top view of the lower pair of parallel arms.
Figure 10:
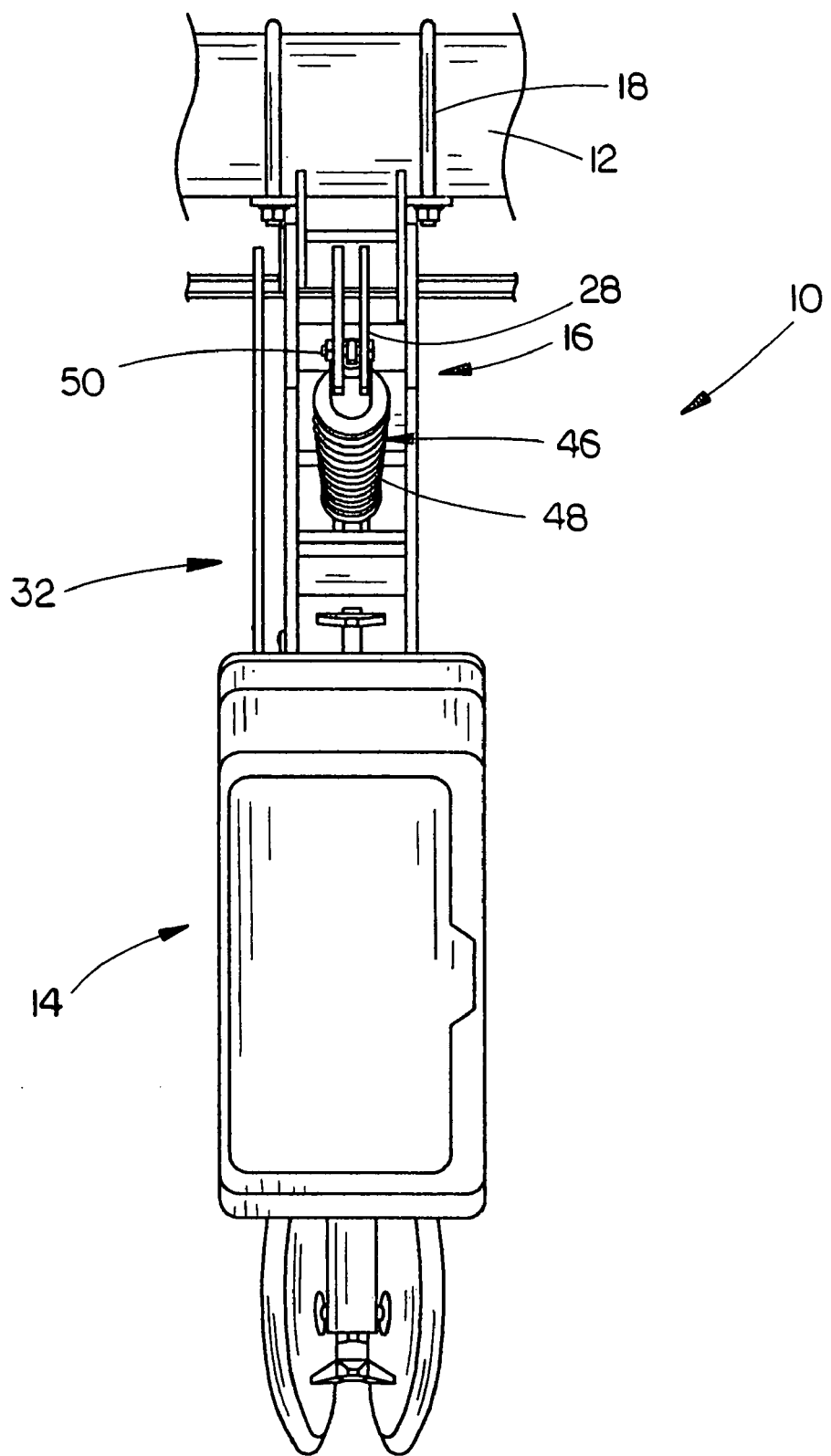
FIG. 10 is a top view of the suspension system and planter unit.
Figure 11:
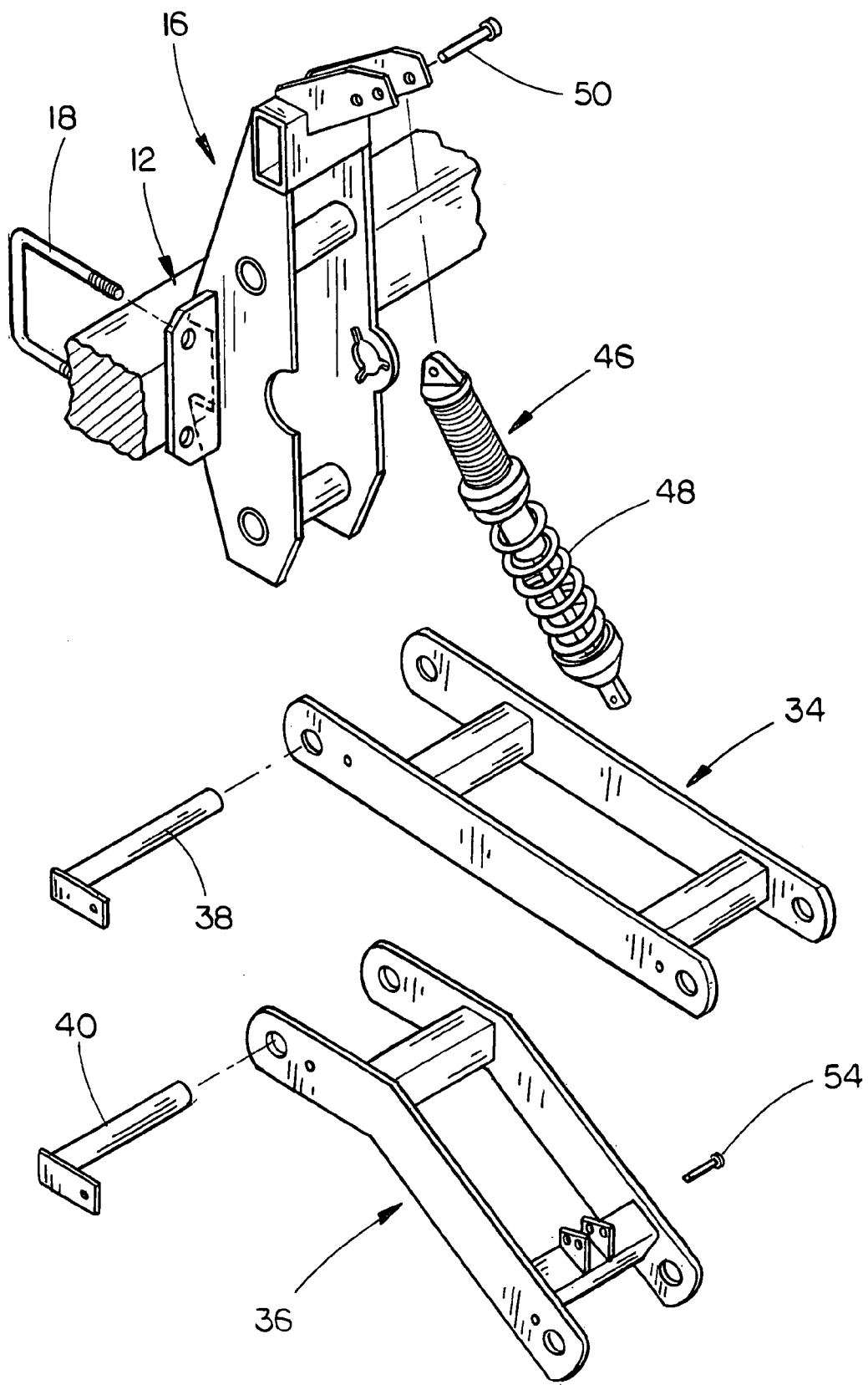
FIG. 11 is an exploded perspective view of the suspension system of this invention.

The numeral 10 refers generally to a row planter which may be either a single row planter or a twin row planter. A twin row planter is disclosed in U.S. Pat. No. 6,520,100. Planter 10 generally includes a toolbar or frame 12 and planter units 14 which include conventional furrow opening discs, depth gauge wheels, furrow closing discs, compaction wheel, etc.

A plurality of horizontally spaced-apart mounting brackets 16 are secured to the toolbar 12 in conventional fashion such as by U-bolts 18 or the like. Mounting bracket 16 includes an upper end 20 and a lower end 22. Mounting bracket 16 includes spaced-apart side plates 24 and 26 which have a rearwardly extending arm assembly 28 at their upper ends. Arm assembly 28 may have a plurality of adjustment openings 30 formed therein.

Each of the planter units 14 is pivotally secured to a mounting bracket 16 by a parallel arm linkage 32 which includes an upper pair 34 of parallel arms and a lower pair 36 of parallel arms. The upper pair 34 of parallel arms is comprised of arms 34A and 34B while the lower pair 36 of parallel arms is comprised of arms 36A and 36B. The forward ends of the upper pair 34 of parallel arms are pivotally secured to the mounting bracket 16 at 38 in conventional fashion. The forward ends of the lower pair 36 of parallel arms are pivotally secured to the mounting bracket 16 at 40 in conventional fashion.

The rearward ends of upper pair 34 of parallel arms are pivotally secured to the associated planter unit at 42. The rearward ends of the lower pair 36 of parallel arms are pivotally secured to the associated planter unit 14 at 44 in conventional fashion.

The numeral 46 refers generally to a fluid-filled shock absorber which is preferably of the coil-over shock type. Coil 48 is adjustable in conventional fashion to vary the down pressure on the planter unit. The upper end of shock absorber 48 is connected to arm 28 of mounting bracket 16 at 50 and extends downwardly and rearwardly therefrom. The lower end of shock absorber 48 is connected to a bracket 52 at 54 which is secured to the lower pair 36 of parallel arms. Although it is preferred that a coil-over shock absorber be utilized, the coil 48 may be omitted if a separate coil is secured to and extended between the upper pair 34 of parallel arms and the lower pair 36 of parallel arms. A suitable shock absorber 46 is readily available from either QA1, 21730 Hanover Avenue, Lakeville, Minn. 55044, or from Bilstein through Speedway. The shock absorber, if purchased from QA1, is identified as Item Number 2179-1B, Shock Mono LRG Steel 13-20 Eye-B/Eye-B, V9-1 Axle Damp. The shock absorber, if purchased from Speedway, is identified as a Bilstein 2" Steel Shock, Part No. 213-S7Z1090. In both shock absorbers, a compression chamber and a rebound chamber are separated by a movable piston having valving incorporated therein which controls the compression damping and the rebound damping. Each of the available shock absorbers is designed so that the damping force in the compression cycle is greater than the damping force in the rebound cycle. In other words, the fluid in the compression chamber will flow through the valving in the piston during the compression cycle at a slower rate (velocity) than the fluid in the rebound chamber will flow through the piston during the rebound cycle. The velocity or damping force is preferably approximately 9-1 and is set at the factory although adjustable shock absorbers are also available.

Shock absorber 46 is positioned on the planter unit so that the fluid in the compression chamber thereof is compressed as the planter unit moves upwardly and so that the fluid in the rebound chamber is compressed as the planter unit moves downwardly. The damping force in the compression cycle is greater than the damping force in the rebound cycle which allows the row unit to go down quickly but move upwardly more slowly, thereby reducing row unit bounce to achieve more uniform seed depth and seed spacing. The shock absorber maintains down pressure throughout the entire travel range by way of the coil spring. The coil spring of the shock absorber may be pre-loaded to increase down pressure on the row unit.

Thus it can be seen that the invention accomplishes at least all of its stated objectives.

I claim:

1. A row crop planter having a transversely extending frame, having rearward and forward sides, which is adapted to be connected to a prime mover, comprising:

a plurality of horizontally spaced-apart mounting brackets secured to the frame at the rearward side thereof;

a seed planter unit positioned rearwardly of each of said mounting brackets;

each of said seed planter units being secured to one of said mounting brackets by a parallel arm linkage pivotally secured to said seed planter unit and the associated mounting bracket to permit said seed planter unit to move vertically with respect to the frame;

each of said parallel arm linkages comprising an upper pair of horizontally spaced-apart parallel linkage arms and a lower pair of horizontally spaced-apart parallel linkage arms;

said upper and lower pairs of parallel linkage arms being vertically spaced-apart;

and a fluid-filled shock absorber secured to and extending between at least some of said mounting brackets and the associated parallel arm linkage to dampen the upward and downward movement of the associated seed planter unit with respect to the frame;

said shock absorber resisting the compression thereof and resisting the rebound thereof;

the compression resistance of said shock absorber being greater than the rebound resistance thereof so that said shock absorber is compressed at a slower speed than it is rebounded so that said seed planter units move upwardly with respect to said frame at a slower speed than they rebound upon encountering irregular terrain or the like.

2. The planter of claim 1 wherein said fluid-filled shock absorber is a coil-over shock absorber.

3. The planter of claim 2 wherein said shock absorber is manually adjustable to vary the compression and rebound damping forces.

4. The planter of claim 1 wherein said shock absorber is a gas pressurized shock absorber.

5. The planter of claim 1 wherein said slower speed of compression and said greater speed of rebound enhances the continued engagement of the associated seed planter unit with the ground to maintain the proper seed spacing of the seed planter unit.

6. A row crop planter having a transversely extending frame, having rearward and forward sides, which is adapted to be connected to a prime mover, comprising:
- a plurality of horizontally spaced-apart mounting brackets secured to the frame at the rearward side thereof;
- a seed planter unit connected to and positioned rearwardly of each of said mounting brackets;
- each of said seed planter units being secured to one of said mounting brackets by a parallel arm linkage pivotally secured to said seed planter unit and the associated mounting bracket to permit said seed planter unit to move vertically with respect to the frame;
- and a fluid-filled shock absorber operatively secured to an associated parallel arm linkage to dampen the upward and downward movement of the associated seed planter unit with respect to the frame;
- said shock absorber resisting the compression thereof and resisting the rebound thereof;
- the compression resistance of said shock absorber being greater than the rebound resistance thereof so that said shock absorber is compressed at a slower speed than it is rebounded so that said seed planter units move upwardly with respect to said frame at a slower speed than they rebound upon encountering irregular terrain or the like.

7. The planter of claim 6 wherein said fluid-filled shock absorber is a coil-over shock absorber.

8. The planter of claim 7 wherein said shock absorber is manually adjustable to vary the compression and rebound damping forces.

9. The planter of claim 6 wherein said shock absorber is a gas pressurized shock absorber.

10. The planter of claim 6 wherein slower speed of compression and said greater speed of rebound enhances the continued engagement of the associated seed planter unit with the ground to maintain the proper seed spacing of the seed planter unit.

* * * * *